United States Patent
Stokes, Jr. et al.

(10) Patent No.: US 10,012,175 B2
(45) Date of Patent: Jul. 3, 2018

(54) THRUST REVERSER TORQUE BOX WITH DISCRETE MAJOR FITTINGS

(71) Applicant: The Boeing Company, Chicago, IL (US)

(72) Inventors: Richard Stokes, Jr., Everett, WA (US); Donald Powell, Everett, WA (US); Robert Morrow, Milton, WA (US)

(73) Assignee: The Boeing Company, Chicago, IL (US)

( * ) Notice: Subject to any disclaimer, the term of this patent is extended or adjusted under 35 U.S.C. 154(b) by 355 days.

(21) Appl. No.: 14/291,296

(22) Filed: May 30, 2014

(65) Prior Publication Data

US 2015/0345424 A1 Dec. 3, 2015

(51) Int. Cl.
*F02C 1/00* (2006.01)
*F02K 1/76* (2006.01)
*B64D 29/06* (2006.01)
*F02K 1/80* (2006.01)

(52) U.S. Cl.
CPC .............. *F02K 1/763* (2013.01); *B64D 29/06* (2013.01); *F02K 1/80* (2013.01); *F05D 2230/60* (2013.01); *Y02T 50/672* (2013.01); *Y10T 29/49231* (2015.01)

(58) Field of Classification Search
CPC ..... F02K 1/54; F02K 1/56; F02K 1/78; F02K 1/80; F02K 1/72; F02K 1/70; F02K 1/62; F02K 1/625
See application file for complete search history.

(56) References Cited

U.S. PATENT DOCUMENTS

| 4,998,409 | A | 3/1991 | Mutch | |
|---|---|---|---|---|
| 5,239,822 | A | 8/1993 | Buchacher | |
| 6,094,908 | A | 8/2000 | Baudu et al. | |
| 8,302,907 | B2 | 11/2012 | Welch et al. | |
| 8,302,908 | B1 * | 11/2012 | Kismarton | B64C 1/26 244/119 |
| 2004/0159741 | A1 * | 8/2004 | Sternberger | F02K 1/72 244/110 B |
| 2008/0271432 | A1 * | 11/2008 | Tsou | F02K 1/72 60/226.2 |
| 2010/0021286 | A1 * | 1/2010 | Somanath | F01D 25/162 415/126 |
| 2010/0132331 | A1 * | 6/2010 | Tsou | F01D 11/003 60/226.2 |

(Continued)

FOREIGN PATENT DOCUMENTS

FR 2983173 11/2011

OTHER PUBLICATIONS

European Search Report dated Nov. 6, 2015 in co-pending European Patent Application No. 15166593.2-1607.

(Continued)

*Primary Examiner* — Gerald L Sung
(74) *Attorney, Agent, or Firm* — Joseph M. Rolnicki; Evans & Dixon, L.L.C.

(57) ABSTRACT

A thrust reverser torque box assembly for an aircraft engine is constructed with a torque tube having a cross section configuration tailored and conducive to carrying torsion and discrete major fittings at opposite ends of the torque tube that connect the torque tube and thrust reverser actuation and reacts loading due to reverse thrust operation to the aircraft engine fan case.

20 Claims, 9 Drawing Sheets

(56) References Cited

U.S. PATENT DOCUMENTS

| | | | |
|---|---|---|---|
| 2010/0193628 A1* | 8/2010 | Welch ................... | B64D 29/06 244/54 |
| 2011/0062279 A1* | 3/2011 | Welch ................... | B21D 39/03 244/54 |
| 2011/0215193 A1 | 9/2011 | Welch et al. | |
| 2011/0233305 A1* | 9/2011 | Elegoet ................. | F01D 25/28 239/265.19 |
| 2011/0277448 A1* | 11/2011 | Roberts ................ | B64D 29/06 60/226.2 |

OTHER PUBLICATIONS

European Office Action dated Mar. 12, 2018, issued in co-pending European Patent Application No. 15166593.2.

\* cited by examiner

THRUST REVERSER TORQUE BOX WITH DISCRETE MAJOR FITTINGS

FIELD

This disclosure pertains to a thrust reverser torque box in an aircraft engine assembly where the torque box is constructed of metallic and/or composite material component parts.

BACKGROUND

Figure 1:
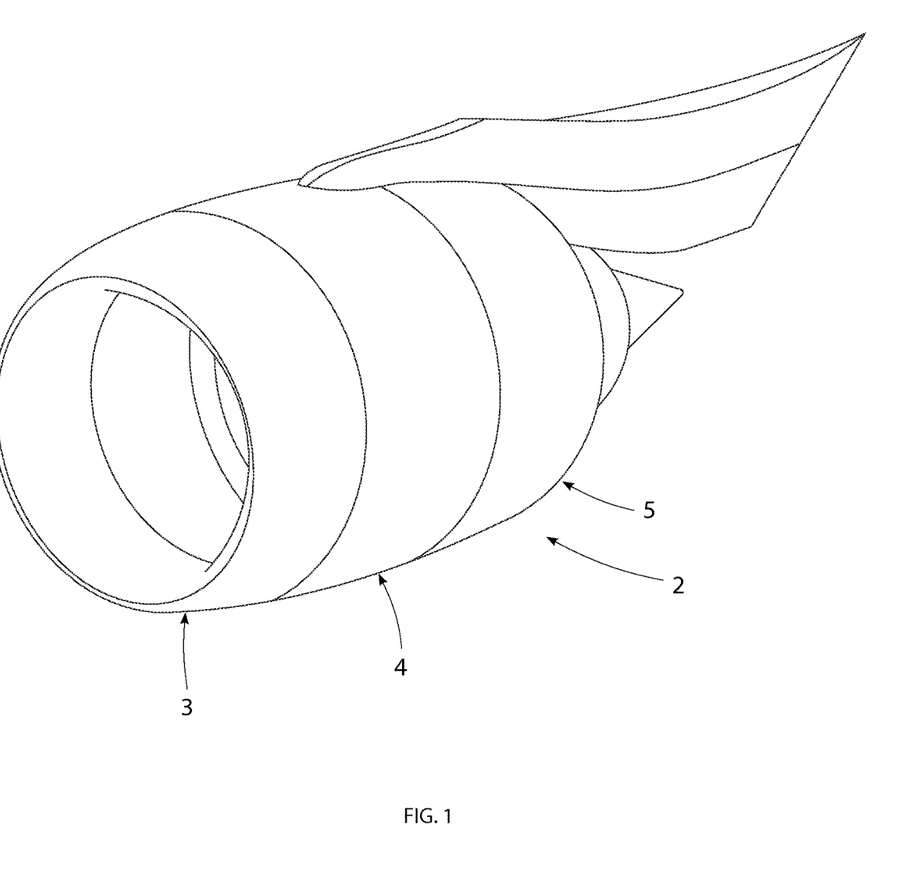
FIG. 1 is a representation of an aircraft engine nacelle.
Figure 2:
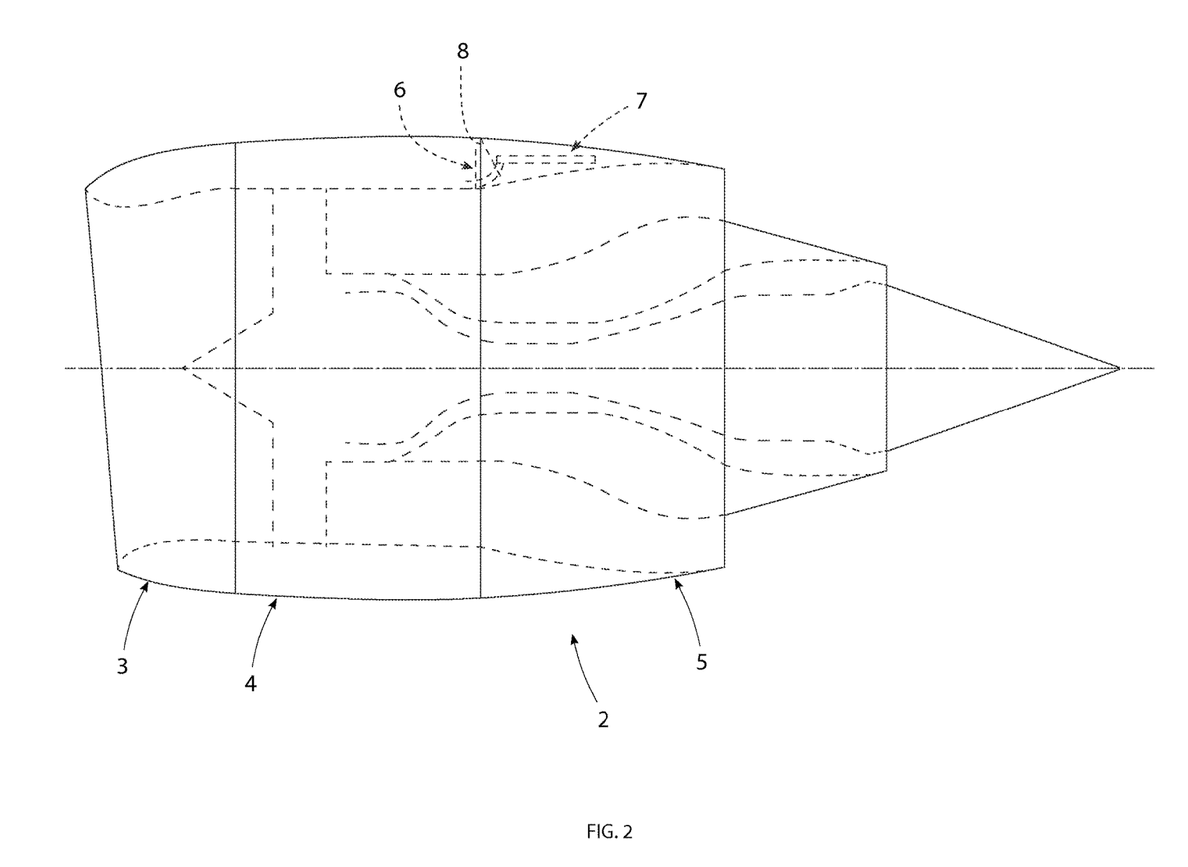
FIG. 2 is a representation of an aircraft engine nacelle with internal components of the engine shown in dashed lines.

Typical commercial aircraft engines are surrounded and encapsulated in aerodynamic structures which form a nacelle 2 represented in FIGS. 1 and 2. The typical nacelle 2 is comprised of an inlet 3, fan cowl 4, and thrust reverser 5. The thrust reverser 5 is an assembly that is made up of a fixed inner structure assembly 6 and a translating structure assembly 7 represented in FIG. 2. The translating structure assembly 7 contains moving blocker doors and a sliding sleeve which when deployed block the fan flow and redirect the fan flow to provide reverse thrust. The fixed structure assembly 6 is made up of two halves that surround the engine core. Each half is hinged off of an engine strut and engages the engine through an inner and outer v-groove interface. The thrust reverser has v-blades that engage the engine v-groove to transmit forward and reverse thrust loads into the engine structure. The main part of the thrust reverser fixed structure assembly that transmits the reverse thrust air loads from the blocker doors and cascades to the engine v-groove is called the Torque Box Assembly 8. The torque box 8 structurally connects the thrust reverser actuation systems 9 to the engine. Because the torque box 8 must react the loads created by the operation of the thrust reverser actuation systems, the construction of the torque box 8 is substantial.

Typically, a torque box 8 is comprised of two generally semi-circular sections that extend around opposite sides of the engine circumference. Each section is typically a closed box, metallic built up structure comprised of multiple sheet metal parts, forgings, and extrusions fastened together by thousands of fasteners per aircraft engine. The construction of the torque box 8 involves multiple processes and a significant amount of assembly time. Each torque box section typically has a constant cross section along its entire length, and the constructions of the sections are not specifically tailored to load at certain points of application and reaction. There are also typically radial stiffening ribs inside the torque box sections that are spatially arranged along the lengths of the sections to stabilize the sections for fatigue and shear buckling between load application areas.

SUMMARY

The thrust reverser torque box assembly of this disclosure is a replacement to the torque box assembly commonly utilized in thrust reversers. The thrust reverser torque box assembly serves as an enabler to reduce weight, assembly time, fabrication time, fastener counts, and part counts.

The torque box assembly provides discrete major fittings at load reaction areas where load is predominantly axial, and it utilizes a torque tube having a cross section tailored for appropriate loading in areas that traditionally carry torsion.

The construction of the thrust reverser torque box assembly of this disclosure reduces the number of parts associated with the assembly. It drastically reduces the number of fasteners because the construction of the torque box does not require radial stiffening ribs for fatigue and shear buckling resistance as in the prior art thrust reverser torque box construction. It also enables a more monolithic overall structure.

The thrust reverser torque box assembly of this disclosure is structurally tailored to accept loads resulting from reverse thrust operation via the thrust reverser actuation system and the cascades of an aircraft engine, react the loads to the engine fan case, and stabilize the induced torsion via a torque tube having a cross section appropriately tailored for loading.

The thrust reverser actuation system reacts through discrete stiffened major fittings of the torque box. Radial and axial loading of the torque box are reactive at the major fittings that are positioned on the torque box at the primary reaction locations for axial and radial loading.

The torque tube extends between and connects together adjacent major fittings. The cross section of the torque tubes is capable of carrying the required tangential and torsional loading of the thrust reverser torque box.

As in a conventional thrust reverser torque box, the thrust reverser torque box assembly of this disclosure is comprised of two predominantly semi-circular sections that are essentially mirror images of each other. Thus, the construction of each semi-circular section is substantially the same. Therefore, only one of the torque box assembly sections is described herein.

The thrust reverser torque box assembly comprises at least first and second major fittings. The fittings are each configured to be connected to a conventional thrust reverser actuation system of an aircraft engine in a conventional manner. The major fittings have cross section configurations that are substantially similar to those of conventional thrust reverser torque boxes. These cross section configurations are typically not circular.

The thrust reverser torque box assembly also includes a tube at least spanning the major fittings. The tube has a length with opposite first and second ends and a cross section configuration that is tailored to predominantly torsional loading. If there are two discrete fittings there is a minimum of one torque tube. If there are three discrete fittings there is a minimum of two torque tubes spanning between adjacent major fittings.

The tube first end is connected to the first major fitting by a first transition section at the tube first end. The first transition section has a cross section configuration that transitions from the cross section configuration of the tube to the cross section configuration of the first major fitting.

The tube second end is connected to the second major fitting by a second transition section at the tube second end. The second transition section has a cross section configuration that transitions from the cross section configuration of the tube to the cross section configuration of the second major fitting.

In one embodiment of the thrust reverser torque box assembly the first transition section is a single piece of continuous material with the tube and the second transition section is a single piece of continuous material with the tube.

In a further embodiment of the thrust reverser torque box assembly the first transition section is a separate piece of material from the tube and the second transition section is a separate piece of material from the tube.

The thrust reverser torque box assembled from the first and second major fittings and the tube enables the reduction of weight, fabrication time, assembly time, fastener count, and part count of the torque box assembly.

The features, functions, and advantages that have been discussed can be achieved independently in various embodiments or may be combined in yet other embodiments. Further details of which can be seen with reference to the following description and drawings.

BRIEF DESCRIPTION OF THE DRAWINGS

Further features of the thrust reverser torque box assembly are set forth in the following detailed description of the torque box assembly and the drawing figures.

DETAILED DESCRIPTION

Figure 3:
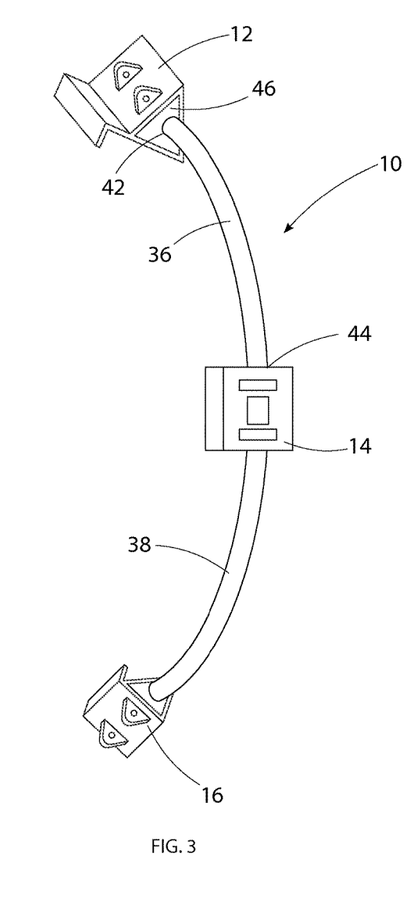
FIG. 3 is a representation of a perspective view of one embodiment of the thrust reverser torque box assembly of this disclosure.

FIG. 3 is a representation of a perspective view of one section of the thrust reverser torque box assembly 10 of this disclosure. As in a conventional thrust reverser torque box assembly, the thrust reverser torque box assembly 10 of this disclosure is comprised of two semi-circular sections that are substantially mirror images of each other. Thus, the construction of each semi-circular section is substantially the same. Therefore, only one section of the torque box assembly 10 is shown in the drawing figure and is described herein.

The thrust reverser torque box assembly 10 is a replacement to the conventional torque box assembly commonly utilized in thrust reversers. The torque box assembly 10 is structurally tailored to accept loads resulting from reverse thrust operation produced by the thrust reverser actuation system and the cascades of an aircraft engine. The loads accepted by the torque box assembly 10 are reacted to the engine fan case in a substantially conventional manner; however, instead of reacting axial loading around the circumference of the engine fan case, loads are reacted only at discrete major fittings located at the approximate location of the thrust reverser actuation system actuators. The construction of the thrust reverser torque box assembly 10 enables a reduced weight, assembly time, fabrication time, fastener counts and part counts from those of the conventional torque box assembly.

Each section of the thrust reverser torque box assembly 10 is comprised of at least first 12 and second 14 discrete major fittings. In the example of the torque box assembly 10 represented in FIG. 3, the assembly section also includes a third discrete major fitting 16. The fittings 12, 14, 16 are each configured to be connected to a conventional thrust reverser actuation system of an aircraft engine in a conventional manner. Because the fittings 12, 14, 16 have substantially the same construction, the details of the construction of the first fitting 12 will be described herein. It should be understood that the construction of the other two fittings 14, 16 are comparable to that of the first fitting 12. The embodiment presented shows very similar construction through fittings 12, 14 and 16; however, it is not required that the fittings be the same. Fittings can be tailored to the load levels to which they are exposed and the components with which they may or may not interface (i.e. hinge/latch beams).

Figure 4:
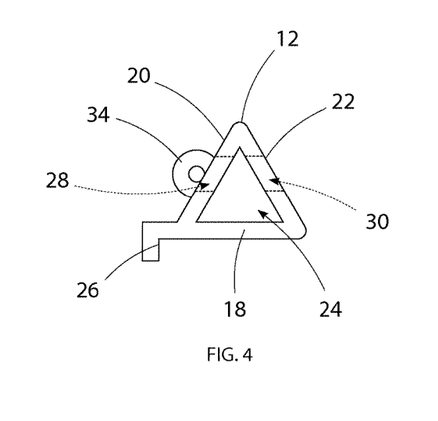
FIG. 4 is a representation of a cross section view of a major fitting of the torque box assembly.
Figure 5:
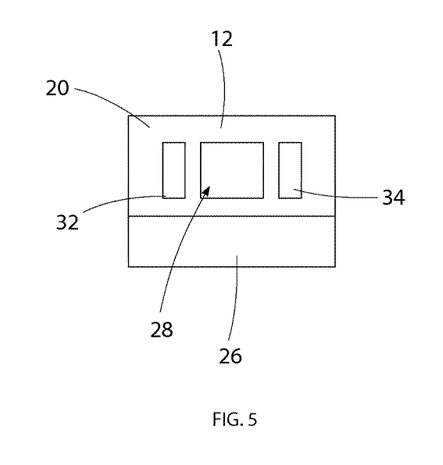
FIG. 5 is a representation of a front elevation view of a major fitting embodiment.

Referring to FIGS. 4 and 5, the first fitting 12 is a stiffened, discreet major fitting similar to current construction. In FIG. 4 the fitting 12 is represented as having a general polygonal cross section configuration such as a triangular cross section configuration. However, this is only one example of a cross section configuration that the first fitting 12 could have. Because the torque box assembly 10 will be secured to other component parts of the aircraft engine, it is only necessary that the fitting 12 have a cross section configuration that is suitable for this purpose. Therefore, the first fitting 12 could have substantially any cross section configuration. The embodiment of the first fitting 12 is metallic and is comprised of a bottom panel 18, a front panel 20 and a rear panel 22. However, it is not required that the fitting 12 be metallic. The panels are connected together in any conventional manner, for example by welding, by fasteners, etc. The panels 18, 20, 22 give the fitting 12 its general triangular configuration with a triangular hollow interior 24. A v-blade 26 is provided at the forward edge of the fitting bottom panel 18. The v-blade 26 interfaces with a corresponding v-groove on the engine fan case and is responsible for reacting axial and radial loading resulting from reverse thrust operation into the engine fan case. Openings 28, 30 are also provided through the respective front 20 and rear 22 panels. The openings 28, 30 are dimensioned to allow a portion of a thrust reverse actuation system to pass through the openings. A pair of flanges 32, 34 are provided on the fitting front panel 20 on opposite sides of the front panel opening 28. The flanges 32, 34 are provided to connect the fitting 12 to a thrust reverser actuation system in any conventional manner. The fitting 12 is secured at high load locations around the aircraft engine. These high load locations tend to be concentrated at the thrust reverser actuation system actuator locations. Axial loading at the v-blade 26 and the outer v-groove on the engine fan case tends to spike at the thrust reverser actuation system locations and connections to the engine. This is why stiffened discreet major fitting 12 is located at these areas.

The section of the thrust reverser torque box assembly 10 also includes at least one torque tube 36 for connecting fittings 12, 14 and 16. In the representation of the section of the torque box assembly 10 shown in FIG. 3, the assembly section includes a pair of circular torque tubes 36, 38. However, in other constructions of the torque box assembly that include only a first fitting 12 and a second fitting 14, the assembly section includes only one torque tube 36. Because the constructions of the torque tubes 36, 38 are substantially the same, only the construction of the first torque tube 36 is described herein.

Figure 6:
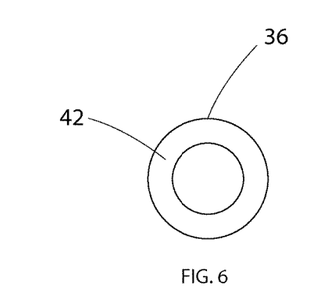
FIG. 6 is a representation of a cross section view of an embodiment of a torque tube of the thrust reverser torque box assembly.

The torque tube 36 has a length with opposite first 42 and second 44 ends, and a cross section configuration that is circular in an embodiment shown in FIG. 6. The torque tube 36 extends between and connects together the adjacent first 12 and second 14 discrete major fittings. The cross section of the torque tube 36 shown in FIG. 6 is capable of carrying the required tangential and torsional loading of the thrust reverser torque box assembly 10. The cross section and construction of the torque tube 36 is to best tailor the tube for efficiently carrying the tangential and torsional loading, versus maintaining the cross sections of the discrete major fittings. The torque tube 36 takes the induced torsion resulting from the operation of the thrust reverser actuation system actuators. The cross section of the torque tube 36 is configured such that secondary requirements can be satisfied, for example connections to the discrete fittings, and the configuration can be optimized to carry torsion. For example, with there being no additional requirements on the torque tube 36, the configuration of the torque tube 36 could be circular. The cross section of the torque tube 36 could also be that of a discrete major fitting it connects to and transition from the configuration at the fitting to a circular configuration of the torque tube 36 and then to another alternative configuration at another discrete major fitting. If the length of the torque tube 36 is required to seal against and provide support to an external nacelle fairing, the torque tube 36 could have a more half circle D-shaped or triangular cross section configuration. The torque tube 36 itself is configured for no connections to the aircraft engine on the tube. The torque tube 36 can be constructed in any conventional manner, and could have other cross sections than the hollow circular cross section of the tube shown in FIG. 6.

The torque tube first end 42 is connected to the first fitting 12 and the torque tube second end 44 is connected to the second fitting 14. There are two methods of connecting the torque tube 36 to the fittings 12, 14, expressed in the embodiments presented, defining two embodiments of the thrust reverser torque box assembly 10.

Figure 7:
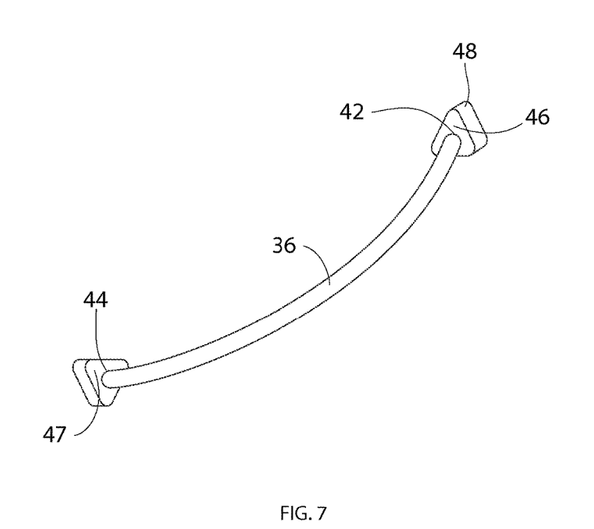
FIG. 7 is a representation of a perspective view of a combination of a torque tube with an embodiment of a transition section of the torque box assembly.
Figure 8:
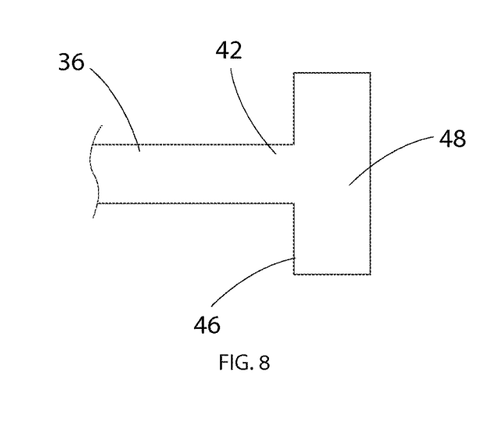
FIG. 8 is a representation of a side elevation view of the transition section of FIG. 7.
Figure 9:
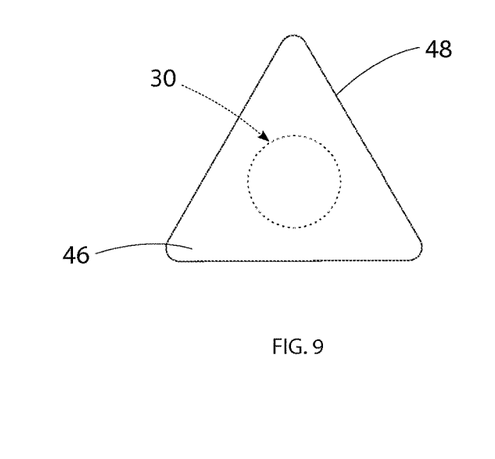
FIG. 9 is a representation of a cross section view of the transition section of FIG. 7.

The torque tube first end 42 is connected to the first discrete major fitting 12 by a first transition section 46 at the tube first end. The first transition section 46 has a cross section configuration that transitions from the cross section configuration of the torque tube 36 to the cross section configuration of the first discrete major fitting 12. Referring to FIG. 7, the first transition section 46 is a single piece of continuous material with the torque tube 36 and the second transition section 47 is a single piece of continuous material with the torque tube 36. Thus, the torque tube 36, the first transition section 46 and the second transition section 47 are monolithic. The cross section configuration of the two major fittings 12, 14 are substantially the same and the cross section configurations of the two transition sections 46, 47 are substantially the same. However, the major fittings could have different cross section configurations. In this situation the two transition sections would also have different cross section configurations. Because constructions of the first 46 and second 47 transition sections are the same, only the construction of the first transition section 46 is described herein. Referring to FIGS. 3 and 7, the first transition section 46 extends from the torque tube first end 42 into the interior 24 of the first fitting 12, the external configuration of the first transition section 46 transitions from the cross section of the torque tube 36 to the cross section configuration of the interior 24 of the first fitting 12. In the embodiment of the thrust reverser torque box assembly 10 shown in the drawing figures, the first transition section 46 transitions to a portion 48 having the general triangular configuration of the first fitting interior 24. This enables the portion 48 of the first transition section 46 to be securely connected in the first fitting interior 24 and to the first fitting 12 by fasteners or other equivalent methods.

The second transition section 47 at the torque tube second end 44 is constructed in the same manner as the first transition section 46 and connects the torque tube second end 44 to the second discrete major fitting 14 in the same manner as the first transition section 46.

Figure 10:
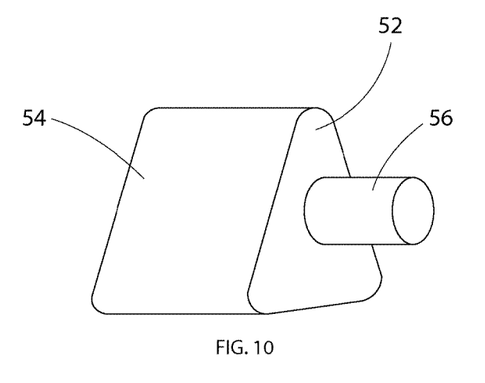
FIG. 10 is a representation of a perspective view of a further embodiment of the transition section of the torque box assembly.
Figure 11:
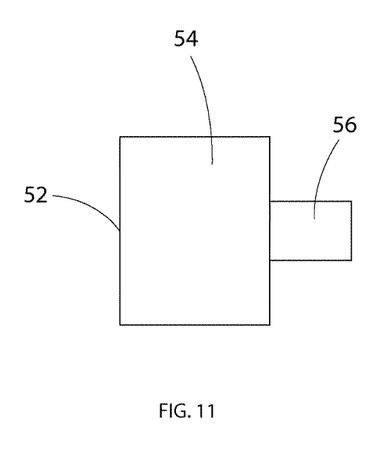
FIG. 11 is a representation of a side elevation view of the transition section of FIG. 10.
Figure 12:
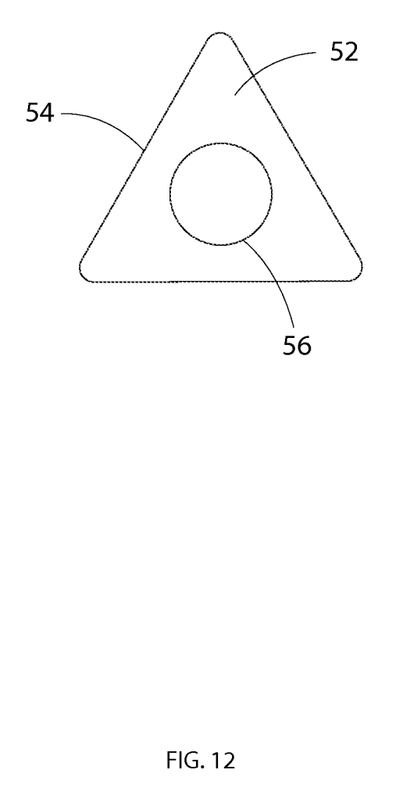
FIG. 12 is a representation of a cross section view of the transition section of FIG. 10.

In a further embodiment of the thrust reverser torque box assembly 10 the first transition section 52 is a separate piece of material or a separate part from the torque tube 36 and the second transition section (not shown) is a separate piece of material or a separate part from the torque tube 36. The first transition section 52 in this embodiment is represented in FIGS. 10-12. The second transition section (not shown) has substantially the same construction as the first transition section 52 and therefore is not disclosed in the drawing figures or described herein. The second embodiment of the first transition section 52 has basically the same configuration as that of the first embodiment of the first transition section 46, except for the second embodiment being separate from the torque tube 36. As shown in FIGS. 10-12, the first transition section 52 has a first portion 54 having a cross section configuration that is shaped to fit tightly into the interior volume 24 of the first fitting 12. A post 56 projects outwardly from a side of the first transition section first portion 54. The post 56 has a cross section comparable to the torque tube 36 and is dimensioned to fit in a tight engagement with the interior of the torque tube 36. The first transition section first portion 54 is secured to the interior of the first fitting 12 by fasteners or other equivalent methods. The first transition section post 56 is secured to the interior of the torque tube 36 by fasteners or other equivalent methods. In this way the first transition section 52 connects the torque tube first end 42 to the first fitting 12. A second transition section (not shown) substantially the same as the first transition section 52 is used to connect the torque tube second end 44 to the second fitting 14. The first transition section 52 could be constructed of the same composite material as the torque tube 36, or a different material.

Figure 13:
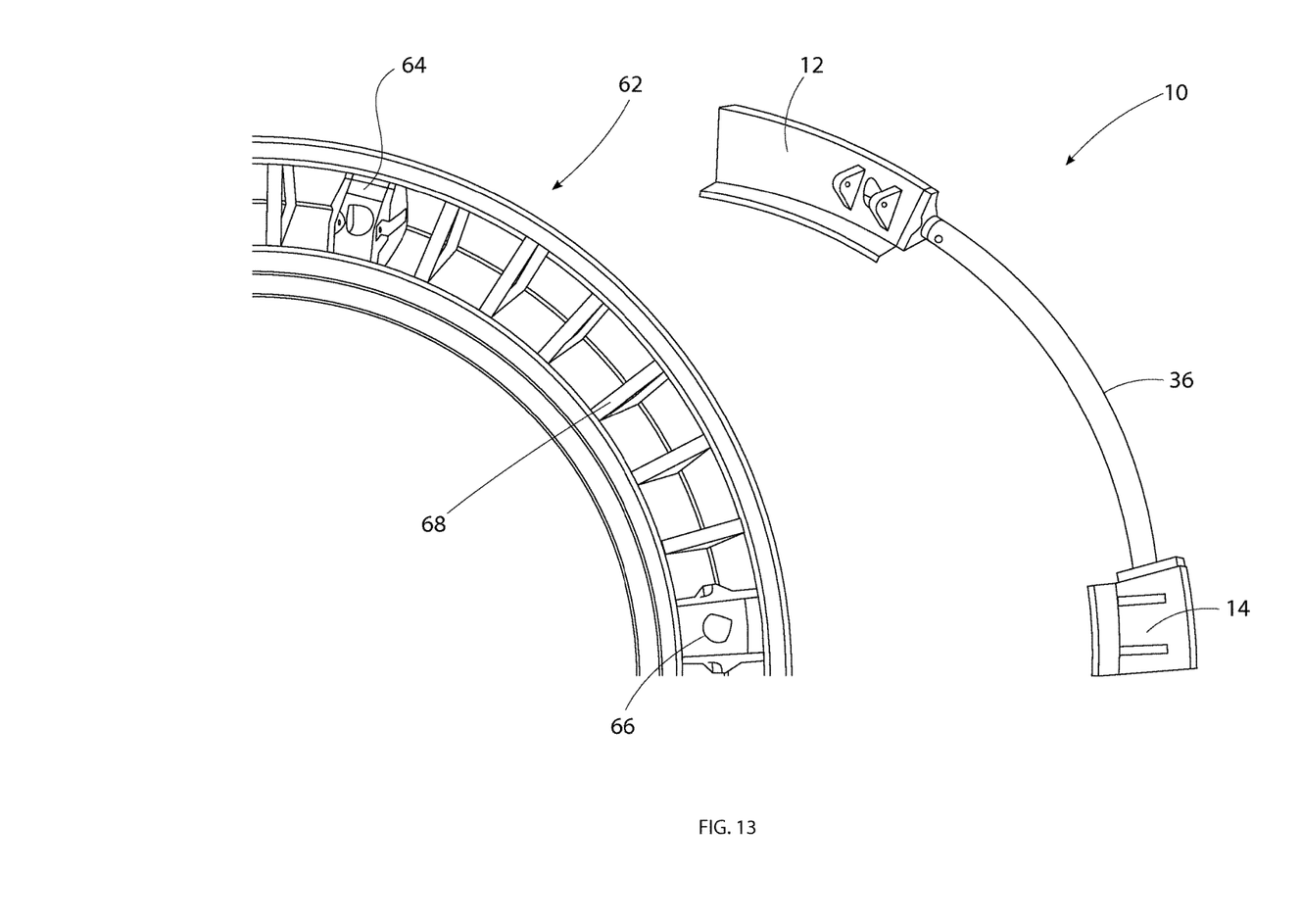
FIG. 13 is a side-by-side comparison of a prior art torque box with the forward web/bulkhead removed to more easily see the number of radial stiffening ribs required to stabilize the structure and the torque box of this disclosure.

In both the described embodiments, the thrust reverser torque box 10 assembled from the first 12 and second 14 discrete major fittings and the torque tube 36 enables a reduction in the weight, fabrication time, assembly time, fastener count, and part count of the torque box assembly 10. To better illustrate this benefit of the torque box assembly 10 of this disclosure, FIG. 13 is a side-by-side comparison of the first described embodiment of the torque box assembly 10 and a conventional torque box 62. The conventional torque box 62 also includes reaction fittings 64, 66 that are each configured to be connected to a conventional thrust reverser actuation system of an aircraft engine. The portion of the torque box 62 that extends between the two fittings 64, 66 basically maintains the same cross section configuration of the fittings. This is in contrast to the torque tube 36 which has a cross section that is specifically tailored or conducive to carrying predominantly torsional loading, versus maintaining the cross section configuration of the fittings. The torque tube 36 itself is not configured for connection to the aircraft engine. This enables removing radial stiffening ribs 68 and removing the fasteners associated with attaching webs and the radial stiffening ribs 68 in between the fittings

64, 66. This reduction in the material volume in between the fittings 64, 66 results in a reduction of weight of the torque box assembly 10 of this disclosure.

As various modifications could be made in the construction of the apparatus and its method of operation herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A thrust reverser of an aircraft engine, the thrust reverser comprising:
    a torque box assembly having a first fitting, the first fitting being configured to be connected to a first actuation system of the thrust reverser, the first fitting having a first polygonal cross section shape and a hollow interior;
    the torque box assembly having a second fitting, the second fitting being configured to be connected to a second actuation system of the thrust reverser, the second fitting having a second polygonal cross section shape and hollow interior; and,
    the torque box assembly having a tube, the tube having a length with opposite first and second ends and a tube cross section shape, the tube cross-section shape being circular, the tube first end being connected to the hollow interior of the first fitting and the tube second end being connected to the hollow interior of the second fitting.

2. The thrust reverser of claim 1, further comprising:
    the tube having no additional fittings configured to be connected to an actuation system of the thrust reverser connected to the tube between the first fitting and the second fitting.

3. The thrust reverser of claim 1, further comprising:
    the tube being constructed of a composite material.

4. The thrust reverser of claim 3, further comprising:
    the first fitting being constructed of a first metal; and,
    the second fitting being constructed of a second metal.

5. The thrust reverser of claim 4, further comprising:
    the tube having a first transition section at the tube first end, the first transition section having a cross section shape that transitions from the tube cross section shape to a cross section shape that matches the first polygonal cross section shape of the first fitting; and,
    the tube having a second transition section at the tube second end, the second transition section having a cross section shape that transitions from the tube cross section shape to a cross section shape that matches the second polygonal cross section shape of the second fitting.

6. The thrust reverser of claim 5, further comprising:
    the first transition section being a single piece of continuous material with the tube; and,
    the second transition section being a single piece of continuous material with the tube.

7. The thrust reverser of claim 5, further comprising:
    the first transition section being a separate part from the tube; and,
    the second transition section being a separate part from the tube.

8. The thrust reverser of claim 5, further comprising:
    the first transition section cross section shape being substantially the same as the second transition section cross section shape.

9. A thrust reverser of an aircraft engine, the thrust reverser comprising:
    a torque box assembly having a first fitting, the first fitting being configured to be connected to a first actuation system of the thrust reverser, the first fitting having a first polygonal cross section shape and a hollow interior;
    the torque box assembly having a second fitting, the second fitting being configured to be connected to a second actuation system of the thrust reverser, the second fitting having a second polygonal cross section shape and a hollow interior;
    the torque box assembly having a tube, the tube having a length with opposite first and second ends and a tube cross section shape, the tube cross-section shape being circular;
    a first transition section at the tube first end, the first transition section having a cross section shape that transitions from the circular cross section shape of the tube to the first polygonal cross section shape of the first fitting, the first polygonal cross section shape of the first transition section being received in the hollow interior of the first fitting; and,
    a second transition section at the tube second end, the second transition section having a cross section shape that transitions from the circular cross section shape of the tube to the second polygonal cross section shape of the second fitting, the second polygonal cross section shape of the second transition section being received in the hollow interior of the second fitting.

10. The thrust reverser of claim 9, further comprising:
    the tube having no additional fittings configured to be connected to an actuation system of the thrust reverser connected to the tube between the first fitting and the second fitting.

11. The thrust reverser of claim 9, further comprising:
    the tube being constructed of a composite material.

12. The thrust reverser of claim 9, further comprising:
    the first transition section being a single piece of continuous material with the tube; and,
    the second transition section being a single piece of continuous material with the tube.

13. The thrust reverser of claim 9, further comprising:
    the first transition section being a separate part from the tube; and,
    the second transition section being a separate part from the tube.

14. The thrust reverser of claim 9, further comprising:
    the first transition section cross section shape being substantially the same as the second transition section cross section shape.

15. A thrust reverser of an aircraft engine, the thrust reverser comprising:
    a torque box assembly having a first fitting, the first fitting being configured to be connected to a first actuation system of the thrust reverse, the first fitting having a first polygonal cross section shape;
    the torque box assembly having a second fitting, the second fitting being configured to be connected to a second actuation system of the thrust reverser, the second fitting having a second polygonal cross section shape;

the torque box assembly having a tube, the tube having a length with opposite first and second ends and a tube cross section shape, the tube cross-section shape being circular;

a first transition section at the tube first end, the first transition section having a cross section shape that transitions from the circular cross section shape of the tube to the first polygonal cross section shape of the first fitting, the first polygonal cross section shape of the first transition section being connected to the first fitting; and, a second transition section at the tube second end, the second transition section having a cross section shape that transitions from the circular cross section shape of the tube to the second polygonal cross section shape of the second fitting, the second polygonal cross section shape of the second transition section being connected to the second fitting.

16. The thrust reverser of claim 15, further comprising:
the tube being constructed of a composite material.
17. The thrust reverser of claim 16, further comprising:
the first fitting and the second fitting being metallic.
18. The thrust reverser of claim 16, further comprising:
the first transition section being a single piece of continuous material with the tube; and,
the second transition section being a single piece of continuous material with the tube.
19. The thrust reverser of claim 16, further comprising:
the first transition section being a separate piece of material from the tube; and,
the second transition section being a separate piece of material from the tube.
20. The thrust reverser of claim 15, further comprising:
the tube having no additional fittings configured to be connected to an actuation system of the thrust reverser connected to the tube between the first fitting and the second fitting.

* * * * *

UNITED STATES PATENT AND TRADEMARK OFFICE
CERTIFICATE OF CORRECTION

PATENT NO. : 10,012,175 B2
APPLICATION NO. : 14/291296
DATED : July 3, 2018
INVENTOR(S) : Richard Stokes, Jr., Donald Powell and Robert Morrow It is certified that error appears in the above-identified patent and that said Letters Patent is hereby corrected as shown below:

In the Claims

In Column 7, Claim 1, Line 31, replace "cross-section" with --cross section--.

In Column 8, Claim 9, Line 20, replace "cross-section" with --cross section--.

In Column 9, Claim 15, Line 3, replace "cross-section" with --cross section--.

Signed and Sealed this
Twenty-sixth Day of February, 2019

Andrei Iancu
*Director of the United States Patent and Trademark Office*